June 12, 1973 T. C. JOHNSON ET AL 3,738,890
METHOD OF BONDING A LAMINATING FILM TO A GRAPHIC ART OBJECT
Filed April 8, 1971 5 Sheets-Sheet 1

INVENTORS
TERENCE C. JOHNSON
MALCOLM E. REED
BY *Schiller & Pandiscio*
ATTORNEYS INVENTORS
TERENCE C. JOHNSON
MALCOLM E. REED
BY
*Schiller & Pandiscio*
ATTORNEYS 3,738,890
METHOD OF BONDING A LAMINATING FILM TO A GRAPHIC ART OBJECT
Terence C. Johnson, Hamden, Conn., and Malcolm E. Reed, Reading, Mass., assignors to Seal, Inc., Derby, Conn.
Filed Apr. 8, 1971, Ser. No. 132,359
Int. Cl. B29c 17/00; C12h 1/00
U.S. Cl. 156—286                9 Claims

ABSTRACT OF THE DISCLOSURE

A vacuum press adapted for laminating transparent protective film to photographs and the like and for dry-mounting the same to suitable substrates or backing materials. The press comprises a base characterized by a flexible air-impermeable wall which supports the work sheets and a cover assembly hinged to the base. The cover assembly includes a platen which when brought into engagement with the base cooperates with the flexible wall to form a reducible work-receiving chamber. Means are provided for heating the platen and indirectly the work and for evacuating the work-receiving chamber to cause the work to be laminated under heat and pressure.

---

This invention pertains to preparation of laminated articles and more particularly to cohesively bonding together two or more sheets of selected materials by application of heat and pressure.

The primary object of this invention is to provide an improved method and apparatus for bonding protective and supporting sheet material to photographs and similar graphic arts media.

Photographs are by nature composed of thin, easily damaged paper and the practice has developed of joining photographs to other materials to provide stiffness and tear resistance and also to protect the image surfaces. Cardboard, Masonite, and the like are commonly joined to the rear side for stiffness and strength while transparent plastic films of materials such as Mylar are commonly joined to the front side for image protection. For convenience, in the graphic arts industry procedure of joining a photograph to a backing sheet is called "mounting" while the procedure of joining a transparent film to the front side of a photograph is called "laminating." When the photograph is attached to a backing sheet by means of a tape or sheet coated on both sides with a hot melt adhesive, it is called "dry mounting." One of the most difficult problems in laminating and dry-mounting photographs is the removal of moisture-laden air from between the assembled components. If the air is not removed, it becomes entrapped and causes undesirable bubbles between the components.

The technique heretofore used to overcome this entrapment is to use heated platens brought together under sufficient pressure to squeeze out the air. For large size graphic arts media, the pressures required for this technique are obtained by the use of hydraulically operated flat platen presses. However, this type of press is expensive, large cumbersome, and slow. Furthermore, it has been difficult to consistently achieve flawless lamination of transparent plastic film to the front side of photographs, etc. even using a substantially amount of skill and care. The quality of lamination is particularly critical in the case of large expensive photographs since a poor lamination cannot be recitified and results in either a total loss or a reduction in the market value of the photograph. Among the more common defects in laminating transparent films to photos, prints and other graphic arts media (e.g. printed documents, xerographic reproductions, diplomas and the like) are wrinkling, uneven application of temperature and pressure, bubbles of air or moisture trapped between the laminated layers, and heat degradation (particularly of colored photographs) due to localized heating excesses. The occurrence of bubbles due to trapped moisture has been practically unavoidable when attempting to laminate a transparent film to a photograph and simultaneously to dry mount the photograph and simultaneously to dry mount the photograph to a porous backing which has a sizable moisture content. Heat degradation is a particularly troublesome matter in the case of colored photographs. Because of these problems, the average commercial photographer sends his large size laminating and dry-mounting work out to a house specializing in that type of work.

Therefore, a more specific object of this invention is to provide a new and improved press for laminating and mounting large size photographs, prints, maps and other graphic arts media that is relatively low in cost, easy to operate, and a means for consistently providing satisfactory results.

Another specific object is to provide an improved method of simultaneously laminating and mounting photographs and the like so that the finished product is free of wrinkles and bubbles.

The foregoing and other objects are achieved by a new vacuum press, so-called because it involves use of the well-known technique (see, for example, U.S. Pats. 3,346,442 and 2,783,176) of generating the pressure required for bonding materials together under heat and pressure by pulling a vacuum in a contractable chamber containing the materials to be bonded. Described briefly, a vacuum press constructed in accordance with the present invention comprises a base having an open horizontal frame, flexible air impermeable wall supported by and extending across said frame, a platen assembly including a flat platen and means for heating said platen, means providing a hinged connected between the platen assembly and base so that the platen assembly can be moved from a first open position in which the upper surface of the flexible wall is exposed to view and a second closed position in which the flat platen overlies the flexible wall. The platen assembly is designed so that when it is in the second closed position, the flat platen and flexible wall form a closed chamber. A port is provided in the platen assembly for withdrawing air from the closed chamber. Operation of the press involves placing the workpiece (i.e. the sheets to be bonded together) on the flexible wall, closing the platen assembly so that the workpiece is enclosed in the chamber formed by the flat platen and the flexible wall, and then actuating a control system which causes the chamber to be evacuated and the workpiece to be heated in a controlled manner so as to effect bonding by heat and pressure and without trapping air or water vapor between the bonded sheets.

Other features and advantages of the invention are described or rendered obvious in the following detailed description which is to be considered together with the accompanying drawings wherein.

Figure 1:
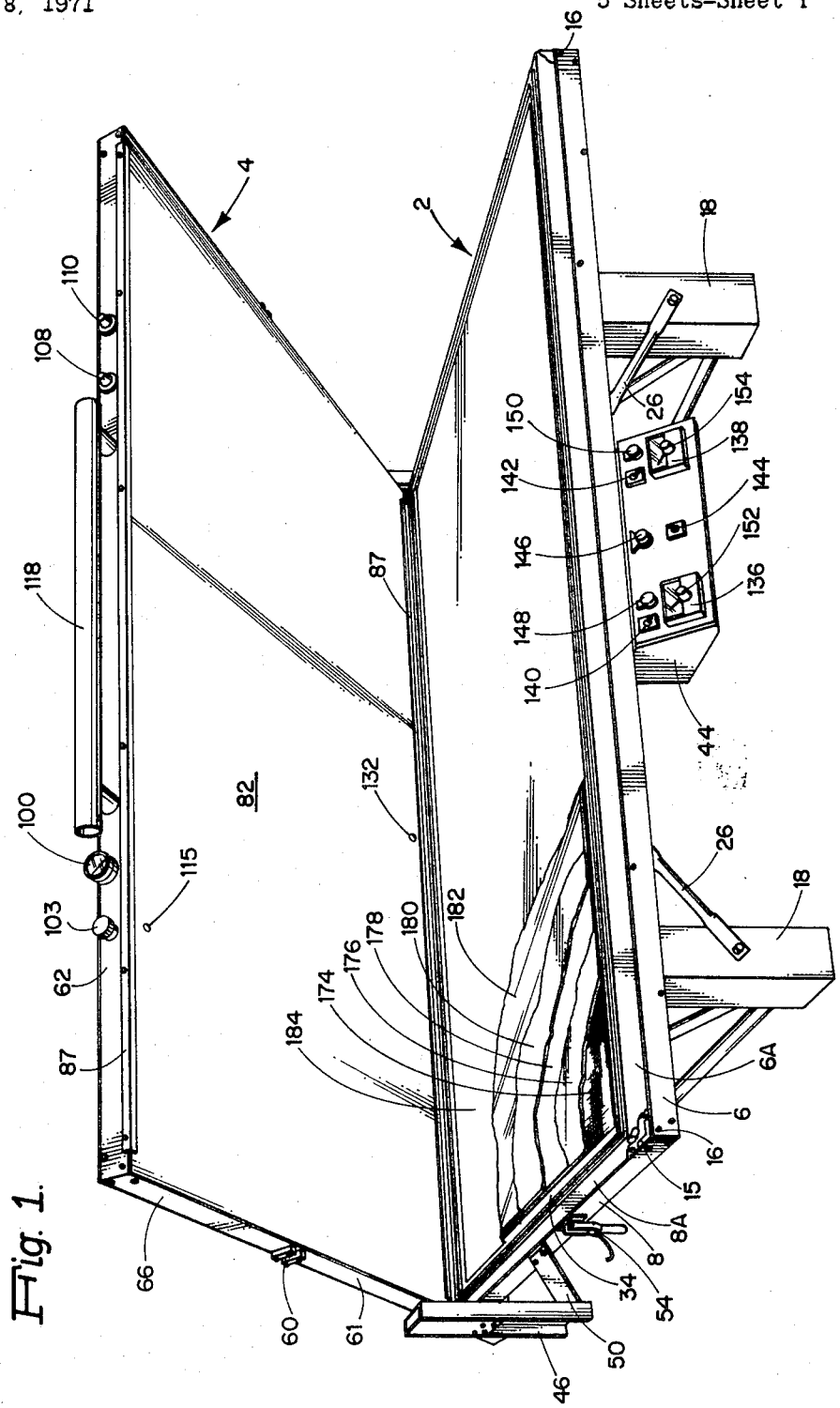
FIG. 1 is a front perspective view of a vacuum press constructed in accordance with the present invention, with the cover assembly in raised position.

Turning now to FIGS. 1-4, the press comprises a self-standing table-like work support assembly 2 and a hinged platen assembly 4. The work support assembly includes a rectangular frame consisting of identical upper and lower sections each made up of four U-shaped channel members. The channel members forming the front and opposite sides of the lower and upper sections of the frame as shown and are identified as 6, 6A, 8, 8A, 10 and 10A. Of the two rear channel members, only the one for the lower frame section is shown in the drawings (see member 14 in FIG. 3). The channel members 6A, 8A and 10A of the upper frame section are secured to each other and to the rear channel member by corner brackets as shown at 15 which are secured by screws 16 or by welding. The four lower channel members are secured to each other in the same way. The upper and lower frame sections are secured to each other by bolts and nuts as shown at 17 (FIG. 5) in clamping relation to flexible sheet 34 described hereinafter.

As an alternative arrangement, the rectangular frame need not have an upper section and a lower section but may consist of a single section made up from channel members with the flexible sheet 34 extending over and wrapped around them and clamped thereto by L-shaped bars similar to bars 87 shown in FIG. 1.

The frame is supported at waist-height by a leg assembly comprising two vertical front legs 18 and two vertical rear legs 20 which are bolted to two parallel beams 22. The latter are secured to the side channel members 8 and 10 of the frame. Leg braces 24 together with tie-rods 25 and struts 26 which connect the legs and the two beams 22 provide rigidity to the work support assembly.

Extending front to rear and supported by the lower frame section is a plurality of rigid bars 28. The latter rest on and are secured to the lower flanges of the front channel member 6 and the corresponding rear channel member 14. Overlying and supported by bars 28 is a stiff, preferably rigid, plate 32. Preferably, plate 32 is an asbestos sheet. It functions to support the flexible work-supporting wall (hereinafter described) when the latter is in relaxed condition so that it will not droop down onto the beams 22; hence it is preferred that plate 32 extend close to but short of the four channel members forming the lower section of the frame. Plate 32 also acts to reduce heat loss through the bottom of the press.

Figure 5:
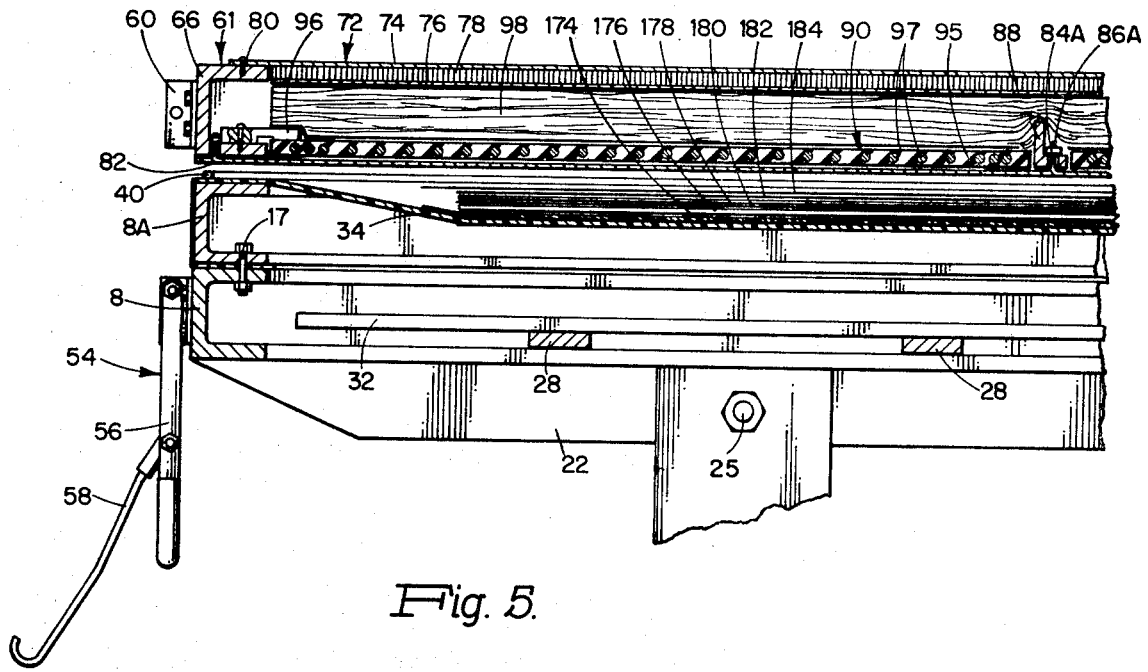
FIG. 5 is a cross sectional view taken substantially along line 5—5 of FIG. 4.

Secured to and supported by the frame of the work support assembly is a sheet 34 (see FIGS. 1 and 5) of flexible air impermeable material that functions as a work supporting wall or bed. Preferably, sheet 34 is made of a natural or a synthetic rubber, e.g., a silicone rubber. However, it may also be a flexible plastic or a rubber or plastic coated fabric. In the illustrated embodiment, sheet 34 extends fully across the open frame and is wrapped over and around the outside of the upper frame section with its edges sandwiched between and clamped by the upper and lower frame sections which are secured together by bolts and nuts as shown at 17. In its relaxed position, a substantial portion of flexible sheet 34 rests on plate 32. Attached to the upper side of flexible sheet 34 directly over the channel member making up the frame of the work support assembly is a rectangular peripheral seal member 40 made of a resilent heat-resistant material such as silicone rubber. Preferably, the seal member 40 is located close to the outside edge of the frame as shown in FIG. 5.

Also forming part of the work support assembly are a vacuum pump 42 which is located at the rear and is attached to two of the cross-bars 28, and a control console 44 attached to the underside of the front portion of the frame. Further details with respect to the vacuum pump and the control console are presented hereinafter. Attached to the rear ends of the opposite sides of the lower section of the frame of the work support assembly are two vertically extending channel members 46 and 48 which are reinforced by braces 50 that also are secured to frame members 8 and 10. Channel members 46 and 48 form part of a torsion bar hinge assembly which is described below. Completing the work support assembly are two toggle clamps 54 attached to the side channel members 10 and 12 of the frame. The toggle clamps each comprise a toggle 56 pivotally secured to the frame and a hook 58 pivotally secured to the toggle. The two toggle clamps 54 are designed to be latched to two brackets 60 carried by the platen assembly described below.

Figure 5A:
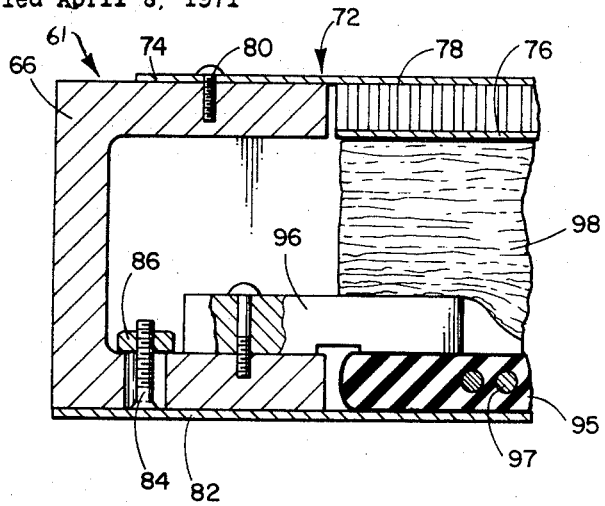
FIG. 5A is an enlargement of a portion of FIG. 5.

The platen assembly also comprises a rectangular frame 61 made up of four channel members 62, 64, 66, and 68 which are connected to each other in the same manner as the channel members of the frame of the work support assembly. The frame of the platen assembly also includes a fifth channel member 70 which extends across between members 66 and 68. Attached to the top side of the frame 61 so as to conceal the space between channel members 62, 66, 68 and 70 is a lightweight yet sturdy cover member 72 which perferably comprises two thin plates 74 and 76 separated by and secured to a honeycomb reinforcing structure 78. Plate 74 is secured to the frame members by screws 80. Mounted on the underside of frame 61 is a flat metal platen 82 with a length the same as or slightly less than the distance between the outside vertical surfaces of channel members 66 and 68 and a width the same as or slightly less than the distance between the outside vertical surfaces of channel members 62 and 70. A series of threaded studs 84 (FIG. 5A) are welded to the upper surface of platen 82 along its four sides. These studs 84 extend through oversized holes in the bottom flanges of channel members 62-70 and secured by nuts 86 as shown in FIG. 5A. Additional studs 84A (FIG. 5) are welded to the upper surface of platen 82 in parallel rows running front to back. These studs 84A extend through oversize holes in a plurality of cross-braces 88 of L-shaped cross-section which are secured at their ends to channel members 62 and 70. The holes in the channel members are large enough to allow the platen 82 to expand and contract unimpeded in accordance with changes in its temperature produced by operation of the heating means described below.

In the practice of this invention it is desirable that the weight of the platen assembly be minimized. Accordingly, its frame and the platen are preferably made of aluminum with the platen being relatively thin. By way of example, the platen is made of 1/16 inch aluminum sheet. However, a thin aluminum platen will tend to droop unless a large number of studs 84 are used so that the spacing between them is about 4 inches or less. The need to use a large number of studs 84 is avoided by attaching elongate bars 87 of L-shaped cross section to the frame members 62 and 70 so that the lower sections of the bars underlie the platen and clamp it against frame members 62 and 70 as shown in FIG. 1. Additional bars (not shown) similar to bars 87 may be used to clamp the sides of 82 to frame members 66 and 68. The bars may be attached by screws as shown and are mounted so as not to prevent expansion and contraction of the platen in its own plane.

The platen assembly also includes electrical heating means for the platen 82. The heating means may be a single large unit, but preferably it comprises a plurality of smaller size units. In this case three heating units 90, 92, and 94 are used. These heater units preferably comprise a flexible resistance wire heating element 97 encased in a sheet or pad 95 of a heat-resistant elastomeric material such as a silicone rubber or other synthetic elastomer. Alternatively, the wire type heating element 97 may be replaced by etched foil type resistance heating elements. Preferably, the heating element is arranged in a tortuous configuration within the elastomer sheet 95 to provide the desired heat distribution. Essentially the heating elements are arranged so that the heater units provide a greater heat density (i.e. greater heat output) at the edges of the platen to compensate for radiative heat losses. The use of flexible heat units of the type described is essential and avoids a major problem that exists if the heater units are of the type in which the resistance heater elements (wire or etched foil) are encased between metal plates. Any platen temperature gradient due to radiative heat losses causes metal encased heaters to buckle due to non-uniform expansion of their exterior metal plates. Such buckling produces an air gap between the heater unit and the platen, necessitating even greater heat density at selected areas. The result is a vicious circle where no satisfactory solution or at least no satisfactory solution at reasonable cost exists. Heater units in which the resisance elements are encased in an elastomer matrix or sheath as above described have no buckling problem. The heating units directly engage the platen and are held in place by cementing their elastomer sheaths 95 directly to the platen. As an alternative measure they may be held in place by spring clamps 96 that are affixed by screws to the frame members 62 and 66–70 (see FIG. 5). Clamps 96 are adapted to permit expansion of the heated units when they are energized. Filling the space between the heater units and the cover member 72 is a heat insulating blanket 98 preferably made of fiber glass. At this point it is to be noted that the frame members 62, 66, 68, and 70 together with cover member 72 may be considered to be a lid for platen 82.

Figure 2:
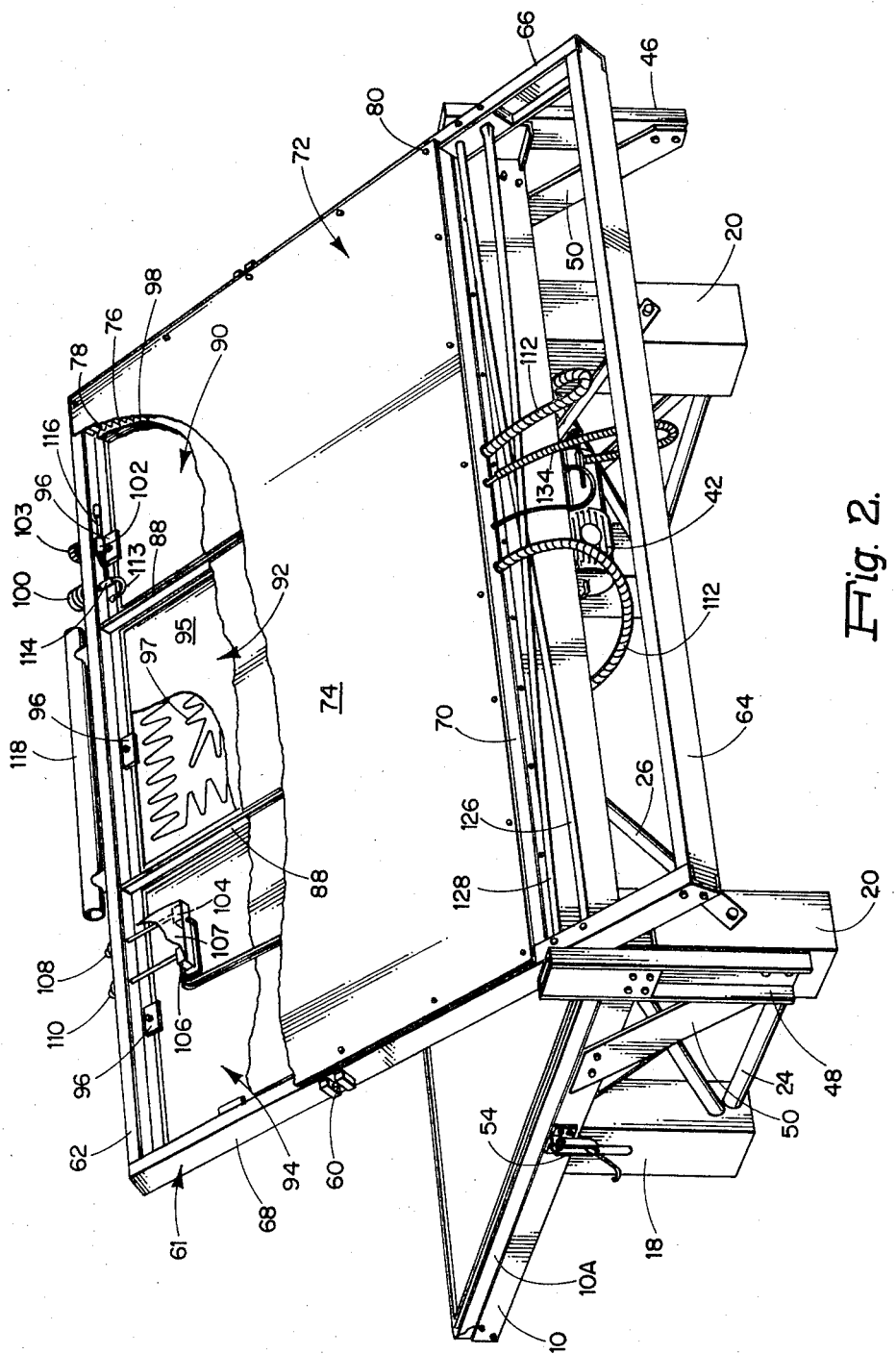
FIG. 2 is a rear perspective view of the same vacuum press with certain parts broken away.
Figure 3:
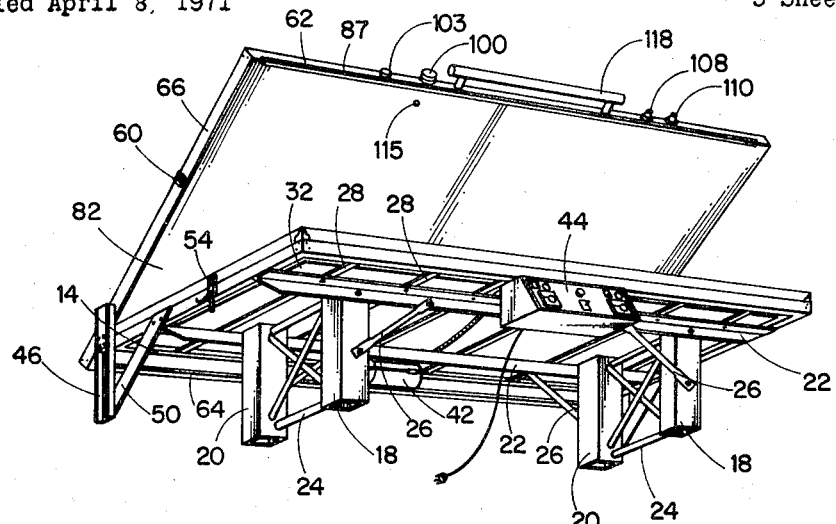
FIG. 3 is a bottom perspective view of the same press.

Referring now to FIGS. 1 and 2, the platen assembly further includes a conventional vacuum gauge 100, a manually operable vacuum control valve 102 having a control knob 103, and two thermostats 104 and 106 of conventional design. The two thermostats are disposed below insulating blanket 98 in direct engagement with the heater unit 94 and are affixed to a bracket 107 that is preferably cemented to heater unit 94 but alternatively may be secured to channel member 62. Thermostats 104 and 106 are adjustable, having rotary control shafts that extend through channel members 62 and are fitted with control knobs 108 and 110 respectively. By way of example the thermostats may be type B-200 manufactured by American Thermostat Co. of South Cairo, N.Y. The thermostats open at different predetermined temperatures as described below. The thermostats and heater units are connected to the source of electrical power and to control circuit elements in console 44 by way of cables such as shown at 112 passing through channel member 70.

Referring to FIG. 2, the stem of vacuum gauge 100 is connected to one side of a T fitting 114 while a second side of the T fitting is connected by a tube 113 to a small bleeder port 115 (see FIG. 3) in the platen. The third side of the T fitting is connected to one of the ports of control valve 102. The other port of valve 102 is fitted with an open tube 116 that communicates with the air in the space above the platen which is essentially at atmospheric pressure since the cover member is not hermetically sealed to the frame of the platen assembly. Valve 102 is normally closed so that the gauge 100 will be responsive to the pressure in the work chamber formed by the platen and flexible wall 34 when the platen assembly is in its closed position as hereinafter described.

Figure 6:
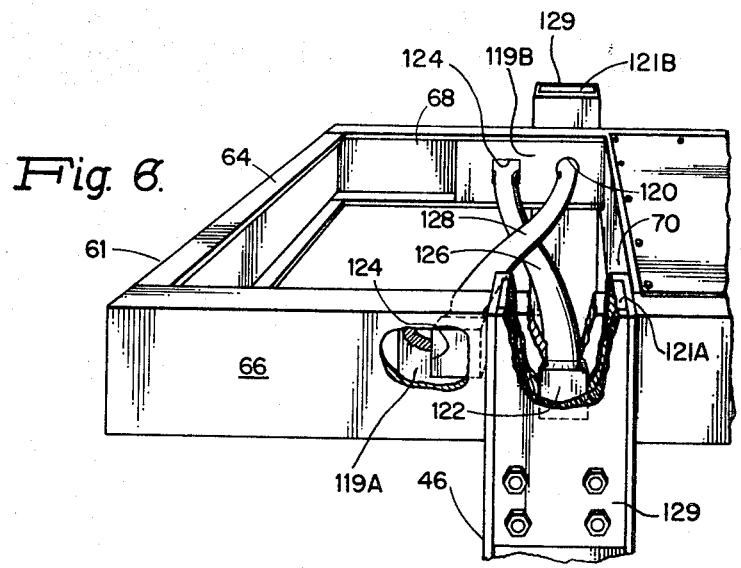
FIG. 6 is a perspective view, partly in section, showing the torsion bar arrangement for biasing the platen assembly to open position.
Figure 7:
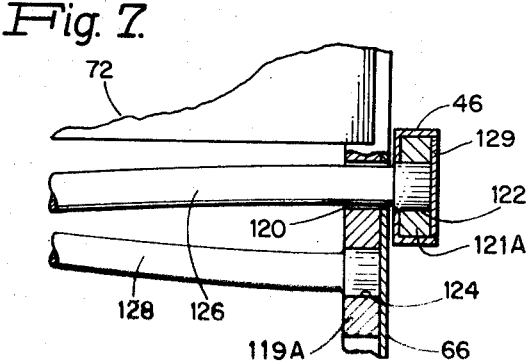
FIG. 7 is a fragmentary plan view, partly in section, of the torsion bar arrangement.

The foregoing platen assembly is hinged to channel members 46 and 48 of the work support assembly as described below and a handle 118 (affixed to frame member 62) is provided to swing the platen assembly into operating position. The hinged connection is best seen in FIGS. 2, 6 and 7. Attached to the inner side of each of the channel members 66 and 68 immediately rearward of channel member 70 are retaining block 119A and 119B. Additional retaining blocks 121A and 121B are secured to the upper ends of channel members 46 and 48. The hinge connections are formed by providing round aligned openings 120 in frame members 66 and 68 and retaining blocks 119A and 119B rearward of frame member 70, a pair of aligned non-circular (preferably square) openings 122 in retaining blocks 121A and B, a pair of aligned, non-circular (preferably square) openings 124 in retaining blocks 119A and 119B rearward of openings 120, and a pair of like torsion bars 126 and 128 of circular cross-section but with ends shaped to mate with openings 122 and 124. Torsion bar 126 has one end anchored in opening 124 of block 119B and the other end extending through holes 120 in retaining block 119A and frame member 66 and anchored in opening 122 of retaining block 121A. Torsion bar 128 is reversely mounted, having one end anchored in opening 124 of retaining block 119A and the other end extending through holes 120 in retaining block 119B and frame member 68 and anchored in opening 122 of retaining block 121B. Cover plates 129 are attached to retaining blocks 121 to prevent axial movement of torsion bars 126 and 128. Opposite axial movement is limited by the fact that the holes 124 in retaining blocks 119A and B are covered by adjacent portions of channel members 66 and 68 (see FIG. 7). With this arrangement, the platen assembly can pivot on one end of torsion bar 126 and the opposite end of torsion bar 128 relative to the channel members 46 and 48. Additionally, the torsion bars 126 and 128 are preloaded (by twisting them as shown) so that they bias the platen assembly in a direction to hold it stationary in the raised position with only a modest force required to be exerted by the operator to lower it.

Figure 4:
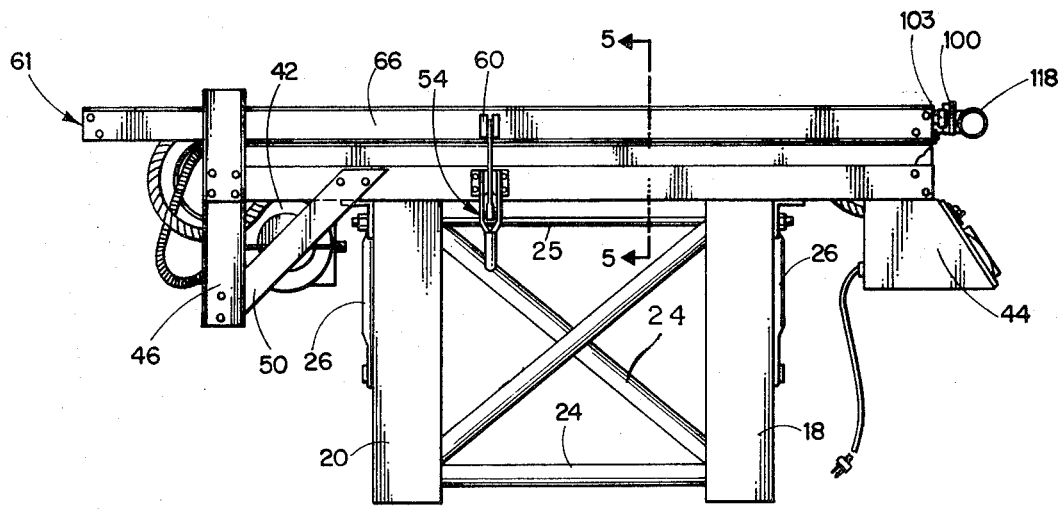
FIG. 4 is a view in side elevation of the same press.

When the platen assembly is lowered to the position shown in FIGS. 4 and 5, the platen engages the resilient gasket 40 and cooperates with flexible wall 34 to form a work-receiving chamber. However, it has been determined that members 66 and 68 tend to bend due to torque applied thereto by the torsion bar arrangement, with the result that when the platen assembly is held in its down position, the side frame members 66 and 68 will not seal tightly at all points along their lengths and the work chamber will not be sealed off from the atmosphere. As a result it will not be possible to pull a vacuum in the chamber. This leakage problem can be avoided by making the frame of the platen assembly of more substantial members, but this will only increase the weight of the platen assembly. Instead the problem is solved by toggle clamps 54. As seen in FIG. 4, clamps 54 are located between the pivot point and the front side of the platen assembly and the hooks 58 have a length such that when locked to brackets 60 the side frame members 66 and 68 are unbent enough to assure continuous sealing between the side margins of the platen and gasket 40. Preferably the clamps 54 and hooks 58 are located at corresponding points about ⅓ of the distance from the pivot axis to the front side of the press which is the point at which the bending arch of members 66 and 68 appears to have its apex.

The work chamber is evacuated by means of a vacuum pump 42. For this purpose the platen is provided with a port 132 adjacent its rear edge and this port is connected to pump 42 by a flexible hose line 134. With the platen assembly locked in closed position by toggles 54 and vacuum control valve 102 closed, operation of pump 42 will withdraw air and substantially all water vapor present from the work compartment and the reduced pressure in the compartment will be indicated by the vacuum gauge. To break the vacuum, as is necessary when the operator wishes to raise the platen assembly, it is necessary only to open valve 102, whereupon air will begin to bleed into the work compartment via port 115 and will also flow into the gauge. The gauge will go to zero vacuum rapidly. The pressure in the work chamber will rise more slowly, but in general, no more than about 15 seconds elapses before the pressure in the work chamber is high enough to permit the operator to easily break the seal between the platen and the gasket and raise the platen assembly to expose the work.

Turning now to FIG. 1, the control console includes two identical motor driven timers 136 and 138, three toggle switches 140, 142, and 144, and a push-button start switch 146, plus indicator lights 148 and 150 associated with toggle switches 140 and 142. The two timers are of the type which when energized will operate for a preselected time period and will then reset and include contacts which open or close at preselected times within the time period. The timers are provided with lights 152 and 154 which are "on" so long as the timers are operating. Such timers are well known and it is not believed necessary to describe them in greater detail since they form no part of the present invention. However, by way of example, the timers may be of the type manufactured by Eagle Signal Co., Division of E. W. Bliss Co., Davenport, Iowa, under the designation Eagle HP55A6.

Figure 8:
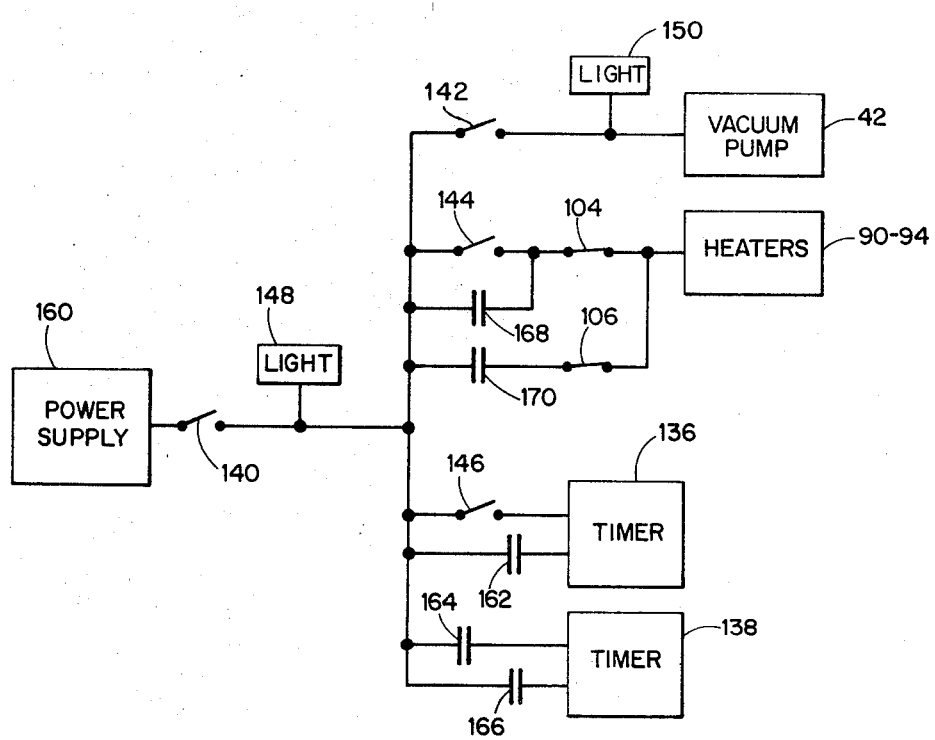
FIG. 8 is a schematic diagram of the control system of the press.

FIG. 8 diagrammatically shows the electrical power and control system for the press. Application of power from a power source 160 is controlled by toggle switch 140. Light 148 is connected to go on when toggle switch 140 is closed. The motor of vacuum pump 42 and indicator light 142 are connected to toggle switch 140 via toggle switch 142. The motor of timer 136 is connected to toggle switch 140 through push-button switch 146 and alternatively through the normally open switch contacts 162 of the same timer. The motor of timer 138 is connected to toggle switch 140 through the normally open contacts 164 of timer 136 and also by the normally open contacts 166 of timer 138. The toggle switch 144 and the normally open contacts 168 of timer 136 are connected in parallel with each other and in series with toggle switch 140, thermostat 104 and heaters 90-94. The second thermostat 106 is connected in series with power source toggle switch 140 and the heater by means of normally open contacts 170 of timer 138. In the usual operation of the press for dry-mounting and laminating colored photographs, the thermostat 104 is set to open at a selected lower temperature and thermostat 106 is set to open at a selected higher temperature.

The foregoing electrical system provides a completely controlled operating sequence and allows the press to be cooled down to room temperature after each use or to be maintained between cycles at a selected preheat temperature determined by thermostat 104. Operation of the electrical system will now be described.

Assuming that the press is at room temperature and the power toggle switch 140 is closed, closing of toggle switch 144 will allow power to be fed to the heaters under the control of thermostat 104. After the press has come up to the preheat temperature, loaded with work and closed, the cycle of operation is started by pressing switch 146. Timer 136 then starts running. As soon as timer 136 starts, its contacts 162 close to hold it in operation after push button switch 146 reopens. At the same time contacts 168 of timer 136 close so that even if toggle switch 144 is accidently opened during the cycle, the heaters will continue to be energized through thermostat 104. When timer 136 times out, its contacts 162 and 168 reopen. At the same time its contacts 164 close to energize timer 138. As soon as timer 138 starts its contacts 166 close to keep it energized after contacts 164 of timer 136 reopen which occurs when it resets itself automatically. Contacts 170 of timer 138 close at the same time as its contacts 166 and thus provide a path for power to the heaters via thermostats 106. When timer 138 times out, its contacts reopen and it resets itself. Thereafter the press will cool down to room temperature if toggle switch 144 is open or will stay at the preheat temperature established by thermostat 104 if switch 144 is closed.

The essential purpose of the two-level temperature control afforded by the above-described control system is to assure substantially complete removal of moisture and other vaporized components of the workpiece before lamination is effected. As indicated above, the typical backing sheet (and often also the article to be mounted or laminated) usually contains a relatively large amount of moisture which vaporizes readily under the application of heat. If the temperature of the workpiece is immediately raised to the activating point of the adhesive layer of the transparent laminating film, bonding will occur before substantially complete removal of water vapor has been effected from the interface between the graphic arts sheet and the laminating film, with the result that the finished product will have bubbles. Before bonding occurs, sufficient time must elapse to permit the moisture that has been released by heat to diffuse out from between the sheets that make up the workpiece and be removed from the work chamber by the vacuum pump. The required time for removal of moisture is afforded by the two-level temperature control. In practice the lower operating thermostat 104 is set so as to open the power circuit to the heaters at a temperature approximately equal to the boiling point of water at atmospheric pressure, but below the activating temperature of the laminating film adhesive, and the preheat timer 136 is set so that the press remains under the control of thermostat 104 for a period sufficient for all free moisture and other gases to be evacuated. The final heat thermostat 106 is set at or slightly above the highest activating point of the several adhesives in the work piece, thereby assuring that all of the adhesives are activated. Usually the adhesive of the dry-mount tissue has an activating temperature sufficiently below that of the laminating film adhesive to allow the thermostat 104 to be set at a temperature such that the dry-mount tissue will bond to adjacent sheets during the time free moisture removal is occurring but the lamination film will remain unbonded until the heaters reach the temperature level set by thermostat 106. As the vacuum pump operates continuously, there is complete removal of moisture between the transparent film and the graphic arts work, so that no air bubbles are formed between those components of the product even though the graphic arts work has become permanently mounted to the backing material with the dry-mount tissue. Alternatively, if the activation temperatures of the several adhesives in the workpiece are not sufficiently different to allow the above procedure, the thermostat 104 may be set at a temperature below that at which the dry-mount tissue will bond adjacent sheets, thereby allowing removal of free moisture prior to bonding.

A typical dry-mounting and laminating operation using the press will now be described. Assume that a photograph is to be dry mounted to a sheet of Masonite using a dry-mounting tissue coated on both sides with an adhesive that is activated at a temperature of 190° F. and that the photograph is to be laminated with a transparent Mylar® film coated on one side with an adhesive that is activated at a temperature of 245° F. The thermostats 104 and 106 are set so that they will open at 210° F. and 270° F. respectively and the timers are set so that timer 136 will time out 10 minutes after it starts and timer 138 will time out 15 minutes after it starts (i.e. 25 minutes from the beginning of the heat cycle). Toggle switches 140 and 144 are closed to energize the heaters. After the press has come up to temperature as determined by thermostat 104, a porous mat 174 is placed on top of the flexible wall 34. Preferably, the mat is made of fiber glass or other suitable heat resistant flexible material that is readily permeable to moisture and air. The porosity of mat 104 facilitates removal of moisture from the workpiece. It is to be noted that the mat 104 may be set in place before the press is heated and may be retained in the press for reuse in successive laminating operations. Next the workpiece is placed on the porous mat. The workpiece consists of a sheet of Masonite 176, a sheet of dry-mount tissue 178 overlying the Masonite, a photograph 180 with its back facing the dry-mount tissue, and a sheet of Mylar® 182 overlying the photograph. The Mylar® sheet has a polyethylene adhesive coating on its bottom side facing the photograph. As an optional measure, a sheet of kraft paper 184 or preferably a silicone-coated release paper is placed over the Mylar® sheet. This added sheet prevents any excess adhesive from coming into contact with the platen and also helps keep the work relatively flat while the platen assembly is lowered. The sheets of the workpiece are smoothed out and then the platen assembly is lowered and locked in place with the toggles 54. The toggle switch 142 is closed to activate the vacuum pump 42 and push-button switch 146 is depressed to start the operation, i.e. to start timer 136. Operation of the vacuum pump evacuates the work-chamber of air and water vapor and as this occurs, the flexible wall 34 is drawn up toward the platen as a result of the difference between the pressures on its opposite sides. The vacuum pump pulls a vacuum sufficient for the flexible wall to press the workpiece against the platen under a pressure of approximately 10–13 lbs. per sq. in. Timer 136 times out and then timer 138 starts running, whereupon power is supplied to heaters 90–94 to raise the platen temperature in accordance with the setting thermostat 106. As the temperature of the workpiece rises to the level determined by the thermostat 106, the adhesive coatings on both sides of the dry-mount tissue are activated first, and because of the applied pressure, the dry mount tissue is bonded to both the photograph and the Masonite backing sheet. As the temperature continues to rise the adhesive on the back of the Mylar® sheet is activated and the applied pressure causes it to be bonded to the photograph. Because the flexible wall is drawn toward the platen slowly and uniformly across its expanse, the sheets making up the workpiece have an opportunity to smooth themselves out. As soon as timer 138 times out (as indicated by its light 154 going off), the operator releases the toggle clamps, raises the platen assembly and removes the finished product. The platen 82 now cools to the temperature determined by thermostat 104 (because of toggle switch 144 being closed) so that the press is in standby condition ready for reuse without need for preheating.

It is to be noted that in the foregoing example the platen was preheated under control of thermostat 104 before the press was closed and the timer 136 was set to time out (and to start timer 138) after removal of most of the water vapor evolved by heating the workpiece to a temperature determined by the setting of thermostat 104. However, other operating procedures may be followed. For one thing, the press may be closed on the workpiece before the platen 82 is fully preheated to the temperature level determined by thermostat 104. This alternative procedure is not preferred since it increases the total time required to complete the dry-mounting and laminating operation. Another alternative procedure is to shift temperature control to thermostat 106 before the work chamber has been evacuated sufficiently to achieve maximum workpiece compression or before most of the water vapor released by heating the workpiece to the temperature determined by the setting of thermostat 104 has been removed from the work chamber. It is to be noted that additional water vapor is removed as the platen's temperature rises to the level determined by thermostat 106. It also is possible to bypass heating under control of timer 136. Thus it is contemplated that the timer 136 may be set at zero time and the press platen 82 preheated under control of thermostat 104 (energized by closing toggle switch 144). The press is closed on the work and evacuated, and then push-button switch 146 is closed. Since timer 136 is set at zero, its contacts 164 close when push-button switch 146 is closed, i.e. timer 136 behaves as if it had just timed out. Timer 138 starts running with closing of contacts 164 and continues running (through its contacts 166) until it times out. The contacts 170 of timer 138 are closed and provide a path for power to the heaters via thermostats 106 while timer 138 is running. Setting timer 136 at zero time is the same as eliminating that timer and connecting push-button switch 146 directly to timer 138.

Obviously the press may be used solely for dry-mounting or solely for laminating. Removal of water is less of a requirement where only dry-mounting is to be performed and hence it is possible to operate in a single temperature mode (achieved by closing only switches 140 and 144) with the thermostat 104 set so that the temperature of platen 82 will be at a level just sufficient to activate the adhesive of the dry-mount tissue. Straight dry mounting can also be accomplished with the press operating in a dual temperature mode, the platen being kept at a lower preheat temperature while in the standby condition and being raised to a higher adhesive-activating temperature after the press is closed.

It is also obvious that the press may be constructed otherwise than as described. Thus the platen assembly may be counterbalanced by means other than a torsion bar arrangement and means other than a toggle may be used to lock the platen assembly to the work support assembly. It is also to be appreciated that the flexible wall may be secured to its supporting frame in a manner other than as described.

Thus the plate 32 may be omitted and the beams 22 may be arranged so that the flexible work-supporting wall 34 is supported only at its side edges. It also is appreciated that the resilient peripheral seal member or gasket 40 may be an integral part of the work-supporting wall 34 (e.g. it may be a rib molded as part of wall 34) or it may be attached directly to the flat metal platen 82.

It is to be understood that the gasket 40 is used because the work-supporting wall 34 is relatively thin and hence will not compress enough under the weight of the platen assembly to form a tight edge seal with the platen 82. However, it is contemplated that gasket 40 may be omitted if the work supporting wall has sufficient resiliency to be compressible to the extent required to make a good seal. Thus as a further alternative measure, gasket 40 may be omitted and the work supporting wall 34 may comprise a flexible air impermeable sheet having a layer of resilient material (such as silicone rubber) on its upper side that extends over the frame of the work support assembly 2 so as to provide the same sealing function as gasket 40. It also is contemplated that even with the gasket 40 a resilient heat resistant pad may be positioned on the work supporting wall 34 to act as a support for the workpiece.

It is to be noted that a press constructed according to the preesnt invention offers a number of advantages over apparatus for the same purpose designed according to the techniques of the prior art. For one thing, it is more convenient and easy to use. It also assures that high quality laminations can be produced repetitively and reduces the degree to which the quality of the product is dependent on the skill of the operator. Still other advantages will be obvious to persons skilled in the art.

As used herein the term "laminating film" denotes a plastic film having on at least one side thereof a coating of a heat sealable material; e.g., a film of transparent polyethylene terephthalate coated with polyethylene. Further, the term "graphic arts object" denotes an article in sheet or plate form that carries graphic information on at least one side thereof. The graphic information may take place the form of but need not be limited to printing, photographic or xerographic images, embossed information, and the like. "Dry-mount tissue" means a sheet of paper or other sheet material coated on one or both sides with a hot melt adhesive.

What is claimed is:

1. A method of bonding a laminating film to a graphic arts object under heat and pressure comprising, placing said film and said object in stacked relation to each other on a flexible air-impermeable sheet that is supported at its edges, positioning a metal platen over said film and said object in sealed relation to said air-impermeable sheet so that said platen and said sheet form a closed work chamber containing said film and said object, evacuating said work chamber while applying atmospheric pressure to said air-impermeable sheet exterior of said work chamber and concurrently heating said film and object by transfer of heat from said platen so as to effect removal of free moisture from said work chamber and so that said air-impermeable sheet is caused to draw said film and object up tight against said platen under a pressure determined by the difference between the pressures exterior and interior of said work chamber, and thereafter bonding said laminating film to said object.

2. Method of claim 1 wherein while said chamber is being evacuated so as to cause said sheet to draw said film and object up tight against said platen, said sheet and said film are heated to a temperature that is insufficient for said film to bond to said object, and further wherein bonding is effected by increasing the temperature of said film and object.

3. A method according to claim 1 wherein said film and object are heated by electrically heating said platen.

4. A method of dry mounting and laminating a graphic arts object comprising placing on a flexible air-impermeable sheet a workpiece comprising in vertical stacked relation (1) a substrate, (2) a dry mount tissue coated on both sides with an adhesive that is activated when heated to a predetermined temperature, (3) said graphic arts object and (4) a laminating film, said tissue being disposed between said substrate and said graphic arts object and said film being disposed over and engaging said graphic arts object; positioning a metal platen over said workpiece in sealed relation to said air-impermeable sheet so as to form a closed chamber containing said workpiece, heating said workpiece by heat transfer from said platen to a first temperature insufficient to bond said film to said graphic arts object and concurrently evacuating said work chamber so as to remove free moisture therefrom and so that said air-impermeable sheet is caused to force said workpiece up tight against said platen under a pressure determined by the pressures interior and exterior of said work chamber, thereafter raising the temperature of said workpiece by heat transfer from said platen to a level at which said film will bond to said object under said pressure, bonding said film to said object, and thereafter moving said platen away from said workpiece and removing said workpiece.

5. Method according to claim 4 wherein said first temperature is sufficient to activate the adhesive of said tissue, whereby said tissue is bonded to said graphic arts object and said substrate before said film is bonded to said object.

6. Method according to claim 1 wherein said film is a sheet of a transparent plastic material having a heat-activatable adhesive coating on a surface thereof, and further wherein said film and object are stacked so that said adhesive coating engages said object.

7. Method according to claim 4 wherein said film is a sheet of transparent plastic material having a heat activatable adhesive coating on a surface thereof that must be heated to a temperature higher than said predetermined temperature in order to be activated, and further wherein said film is disposed so that its adhesive coating engages said graphic arts object.

8. A method of bonding a laminating film to a graphic arts object under heat and pressure comprising, placing said film and said object in stacked relation to each other on a flexible air-impermeable sheet that is supported at its edges, positioning an electrically heatable platen over said film and said object in sealed relation to said air-impermeable sheet so that said platen and said sheet form a closed work chamber containing said film and said object, evacuating said work chamber while applying atmospheric pressure to said air impermeable sheet exterior of said work chamber so that said flexible sheet is caused to compress said film and said object up against said platen under a pressure determined by the difference between the pressures exterior and interior of said work chamber, electrically heating said platen as said chamber is being evacuated so as to effect removal of free moisture from said work chamber, and thereafter bonding said laminating film to said object by transfer of heat to said film from said platen.

9. Method of claim 8 wherein while said chamber is being evacuated so as to draw said sheet and said film and object up tight against said platen, said sheet and said film are heated to a temperature that is insufficient for said film to bond to said object, and further wherein bonding is effected by increasing the temperature of said platen.

References Cited
UNITED STATES PATENTS

| | | | |
|---|---|---|---|
| 2,620,289 | 12/1952 | Douglas | 156—286 |
| 3,600,249 | 8/1971 | Jackson et al. | 156—285 |
| 2,698,273 | 12/1954 | Miner et al. | 156—285 |
| 3,311,517 | 3/1967 | Keslar et al. | 156—286 |
| 3,322,601 | 5/1967 | Wong et al. | 156—286 |
| 3,575,756 | 4/1971 | Maus | 156—286 |

DOUGLAS J. DRUMMOND, Primary Examiner

U.S. Cl. X.R.

100—93 P; 150—211; 156—382